(12) United States Patent
Li

(10) Patent No.: US 9,572,032 B2
(45) Date of Patent: Feb. 14, 2017

(54) METHOD AND SYSTEM FOR TERMINAL TO ACCESS NETWORK AND TERMINAL

(71) Applicant: ZTE CORPORATION, Shenzhen, Guangdong Province (CN)

(72) Inventor: Jianyong Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 50 days.

(21) Appl. No.: 14/413,426

(22) PCT Filed: Jul. 12, 2013

(86) PCT No.: PCT/CN2013/079278
§ 371 (c)(1),
(2) Date: Jan. 8, 2015

(87) PCT Pub. No.: WO2013/185667
PCT Pub. Date: Dec. 19, 2013

(65) Prior Publication Data
US 2015/0195711 A1 Jul. 9, 2015

(30) Foreign Application Priority Data
Jul. 30, 2012 (CN) .......................... 2012 1 0268205

(51) Int. Cl.
*H04W 12/08* (2009.01)
*H04L 29/06* (2006.01)
(Continued)

(52) U.S. Cl.
CPC .............. *H04W 12/08* (2013.01); *H04L 63/10* (2013.01); *H04L 63/107* (2013.01); *H04W 12/04* (2013.01); *H04W 84/12* (2013.01)

(58) Field of Classification Search
CPC ...... H04W 12/08; H04W 12/04; H04W 84/12; H04L 63/10; H04L 63/107
See application file for complete search history.

(56) References Cited

U.S. PATENT DOCUMENTS

2003/0142641 A1* 7/2003 Sumner ............... H04L 63/0428
370/328
2007/0070935 A1* 3/2007 Prakash ................ H04L 63/102
370/328
(Continued)

FOREIGN PATENT DOCUMENTS

CN 101605329 A 12/2009
CN 102595407 A 7/2012
WO WO 2010148260 A1 * 12/2010 ........... G01S 5/0205

OTHER PUBLICATIONS

Sagiraju et al., Enhancing Security in Wireless Networks Using Positioning Techniques, Apr. 2007, IEEE International Conference on System of Systems Engineering, pp. 1-6.*

*Primary Examiner* — Kenneth Chang
(74) *Attorney, Agent, or Firm* — Ling Wu; Stephen Yang; Ling and Yang Intellectual Property

(57) ABSTRACT

Provided are a method and system for a terminal accessing to a wireless local area network, and a terminal thereof, wherein the method includes: a terminal which does not know a wireless local area network access key sending a key acquisition request to a shared server in the wireless local area network, wherein the request carries a terminal location and a service set identifier (SSID); the shared server in the wireless local area network selecting an access key based on a correspondence relationship between the terminal location, the SSID and the access key, and sending the selected access key to the terminal; the terminal accessing to the wireless local area network according to the access key. The embodiment of the present document enables the terminal efficiently and conveniently access to a wireless local area network.

14 Claims, 3 Drawing Sheets

(51) Int. Cl.
*H04W 12/04* (2009.01)
*H04W 84/12* (2009.01)

(56) References Cited

U.S. PATENT DOCUMENTS

| | | | | |
|---|---|---|---|---|
| 2008/0060064 A1* | 3/2008 | Wynn | .................... | H04L 63/062 |
| | | | | 726/5 |
| 2008/0198823 A1* | 8/2008 | Shiu | ...................... | H04W 48/20 |
| | | | | 370/338 |
| 2009/0131020 A1* | 5/2009 | van de Groenendaal | ......... | H04L 63/102 |
| | | | | 455/411 |
| 2012/0276920 A1* | 11/2012 | Mangold | ................ | H04W 4/02 |
| | | | | 455/456.1 |

\* cited by examiner

METHOD AND SYSTEM FOR TERMINAL TO ACCESS NETWORK AND TERMINAL

TECHNICAL FIELD

The present document relates to the field of wireless local area network access, and more particularly, to a method and system for a terminal accessing to a wireless local area network, and a terminal thereof.

BACKGROUND

With the evolution and successful development of the wireless local area network, people have demands to integrate the wireless local area network and the mobile cellular network together. The main purpose of this integration is to develop a new mobile data network, making the ubiquitous data services be capable of high data transmission in the wireless local area network, meanwhile the wireless local area network can reduce the pressure brought by a large number of data services to the data traffic in the mobile cellular network.

For safety reasons, however, most of the wireless local area networks use key cryptography to limit the accessing terminal. If the terminal wants to access the abovementioned wireless local area network, it needs to consult with the wireless local area network administrator about the key, for example, a customer in a restaurant or cafe consults with the salesperson about the key, and such a key acquisition mode is not only inefficient, but also vulnerable to human factors.

SUMMARY

The embodiment of the present document provides a method and system for a terminal accessing to a wireless local area network, and a terminal thereof, to solve the technical problem about how a terminal which does not know an access key efficiently and conveniently accesses to the wireless local area network.

To solve the abovementioned technical problem, the embodiment of the present document provides a method for a terminal accessing to a wireless local area network, comprising:

a terminal which does not know a wireless local area network access key sending a key acquisition request to a shared server in the wireless local area network, wherein the request carries a terminal location and a service set identifier (SSID);

the shared server in the wireless local area network selecting an access key based on a correspondence relationship between the terminal location, the SSID and the access key, and sending the selected access key to the terminal; and the terminal accessing to the wireless local area network according to the access key.

The method further comprises:

the correspondence relationship between the terminal location, the SSID and the access key being notified by a terminal which knows the wireless local area network access key to the shared server in the wireless local area network.

the step of the correspondence relationship between the terminal location, the SSID and the access key being notified by the terminal which knows the wireless local area network access key to the shared server in the wireless local area network comprises:

after accessing to the wireless local area network via the access key, the terminal which knows the wireless local area network access key notifying the shared server in the wireless local area network of the correspondence relationship between the terminal location, the SSID and the access key via a Hypertext Transfer Protocol Secure (HTTPS).

To solve the abovementioned technical problem, the embodiment of the present document provides a system for a terminal accessing to a wireless local area network, comprising: a terminal which does not know a wireless local area network access key and a shared server in the wireless local area network, wherein, the terminal is configured to: send an access key request to the shared server in the wireless local area network, and the request carries a terminal location and a service set identifier (SSID); and access to an access key come from the shared server in the wireless local area network and access the wireless local area network according to the access key; and the shared server in the wireless local area network is configured to: select an access key according to the correspondence relationship between the terminal location, the SSID and the access key, and send the selected access key to the terminal.

The system further comprises a terminal that knows the wireless local area network access key, the terminal which knows the wireless local area network access key is configured to: send the correspondence relationship between the terminal location, the SSID and the access key to the shared server in the wireless local area network.

The terminal that knows the wireless local area network access key sends the correspondence relationship between the terminal location, the SSID and the access key to the shared server in the wireless local area network in the following way:

the terminal which knows the wireless local area network access key is configured to: after accessing to the wireless local area network through the access key, notify the shared server in the wireless local area network of the terminal position, the SSID and the access key via the Hypertext Transfer Protocol Secure (HTTPS).

The shared server in the wireless local area network further comprises a terminal connection module and a memory module, wherein, the terminal connection module is configured to: receive a message from the terminal, if the message is an access key request carrying the SSID and the terminal location, search in the memory module for the access key corresponding to the SSID and the terminal location, and send the access key to the terminal; if the message is a combination of the SSID, the terminal location and the access key, then save the SSID, the terminal location and the access key into the memory module; and the memory module is configured to: save the correspondence relationship between the SSID, the terminal location and the access key.

To solve the abovementioned technical problem, the embodiment of the present document provides a terminal which accesses to a wireless local area network, comprising: a wireless local area network connection module, a wireless local area network configuration module, and a terminal location acquisition module, wherein, the wireless local area network configuration module is configured to: acquire wireless local area network parameters which comprise a service set identifier (SSID);

the terminal location acquisition module is configured to: acquire the current terminal location; and the wireless local area network connection module is configured to: access to the wireless local area network according to the access key; judge whether the wireless local area network parameters saved in the wireless local area network configuration module comprise an access key or not; if the access key is not comprised, send an access key request to the shared server in the wireless local area network which saves the correspondence relationship between the SSID, the terminal location and the access key, and the access key request carries the SSID acquired from the wireless local area network configuration module and the current terminal location acquired from the terminal location acquisition module; and send the access key come from the shared server in the wireless local area network to the wireless local area network configuration module.

The wireless local area network connection module is further configured to: if determined that the wireless local area network parameters saved in the wireless local area network configuration module comprise the access key, after accessing to the wireless local area network according to the access key, send a network shared triple to the shared server in the wireless local area network, and the network shared triple is the SSID and the access key acquired from the wireless local area network configuration module, as well as the current terminal location acquired from the terminal position acquisition module.

The wireless local area network connection module is further configured to: if determined that the wireless local area network parameters saved in the wireless local area network configuration module comprise an access key, and in the case that the wireless local area network is not shared by other terminals, after accessing to the wireless local area network in accordance with the access key, send a network shared triple to the shared server in the wireless local area network, and the network shared triple is the SSID and the access key acquired from the wireless local area network configuration module, as well as the current terminal location acquired from the terminal location acquisition module.

The wireless local area network connection module sends an access key request and/or a network shared triple to a shared server in the wireless local area network through the following ways:

the wireless local area network connection module is configured to: send the access key request and/or the network share triple to the shared server in the wireless local area network through the hypertext transfer protocol secure (HTTPS).

To solve the abovementioned technical problem, the embodiment of the present document further provides a method for a terminal accessing to a wireless local area network, comprising:

the terminal obtaining wireless local area network parameters and current terminal location, and the wireless local area network parameters comprise a service set identifier (SSID);

the terminal judging whether the wireless local area network parameters comprise the access key or not, if the access key is not comprised, sending an access key request to the shared server in the wireless local area network which saves the correspondence relationship between the SSID, the terminal location and the access key, wherein the access key request carries the obtained SSID and the current terminal location;

the terminal receiving the access key come from the shared server in the wireless local area network; and the terminal accessing to the wireless local area network according to the access key.

The method further comprises:

if the wireless local area network parameters comprise the access key, the terminal accessing to the wireless local area network according to the access key; and the terminal sending a network shared triple to the shared server in the wireless local area network, the network shared triple is the SSID and the access key obtain from the wireless local area network configuration module as well as the current terminal location obtained from the terminal location acquisition module.

The step of the terminal sending the network shared triple to the shared server in the wireless local area network further comprises:

the terminal judging whether the to-be-accessed wireless local area network is shared by other terminals or not, if the to-be-accessed wireless local area network is not yet shared by the other terminals, sending the network shared triple to the shared server in the wireless local area network.

The step of the terminal sending the access key request and/or the network shared triple to the shared server in the wireless local area network further comprises:

sending the access key request and/or the network shared triple to the shared server in the wireless local area network via the Hypertext Transfer Protocol Secure (HTTPS).

With the abovementioned technical scheme, when accessing to the wireless local area network, the terminal automatically acquires an access key from the shared server in the wireless local area network, and no longer needs to take time to laboriously find the wireless local area network administrator for the access key, thereby improving the efficiency of the terminal accessing to the wireless local area network.

PREFERRED EMBODIMENTS OF THE DOCUMENT

Hereinafter in conjunction with the accompanying drawings, the embodiments of the present document will be described in detail. It should be noted that, in the case of no conflict, the embodiments and features in the embodiments of the present application may be arbitrarily combined with each other.

Figure 1:
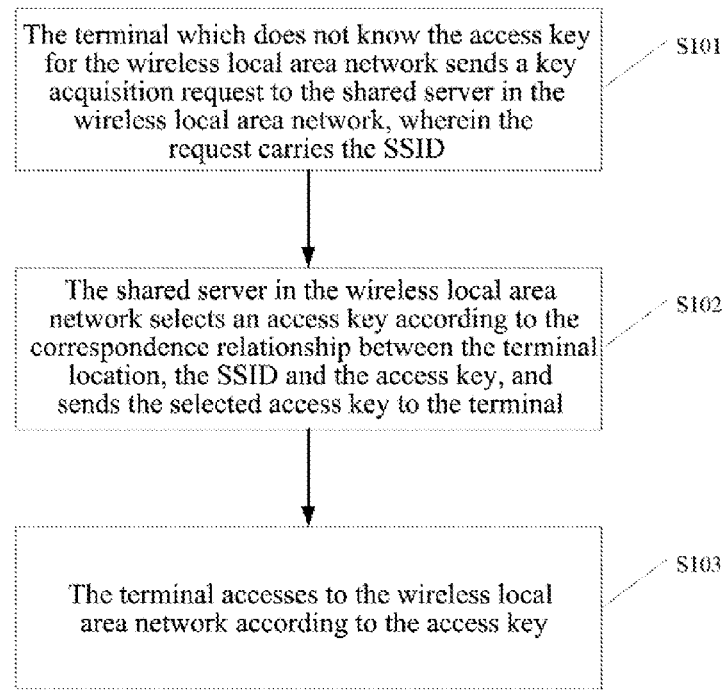
FIG. 1 is a flow chart of a method for a terminal which does not know the access key accessing to the wireless local area network in the present embodiment.

FIG. 1 is a flow chart of the method for a terminal accessing to the wireless local area network in the present embodiment.

S101, the terminal which does not know the wireless local area network access key sends a key acquisition request to the shared server in the wireless local area network, wherein the request carries the terminal location and the service set identifier (SSID);

S102, the shared server in the wireless local area network selects an access key according to the correspondence relationship between the terminal location, the SSID and the access key, and sends the selected access key to the terminal.

The abovementioned correspondence relationship between the terminal location, the SSID and the access key can be saved in the shared server in the wireless local area network, and notified by the terminal which knows the wireless local area network access key to the shared server in the wireless local area network. In order to ensure the security of information interaction between the terminal and the shared server in the wireless local area network, the correspondence relationship between the terminal location, the SSID and the access key can be notified by the terminal which knows the wireless local area network access key to the shared server in the wireless local area network through the Hypertext Transfer Protocol Secure (HTTPS) after the terminal which knows the wireless local area network access key accesses to the wireless local area network via the access key.

S103, the terminal accesses to the wireless local area network according to the access key.

In the following, the abovementioned embodiment will be described with a specific application example.

Step 1, the terminal UE A which knows the wireless local area network access key turns on the Wi-Fi switch at the position L, searches out a Wi-Fi hotspot (Hotspot X) which needs the access key in order to access into the network, initiates a connection to the Hotspot X, and accesses to the Hotspot X via the known access key;

step 2, the UE A sends its own saved service set identifier (SSID), terminal location (x, y) and access key to the shared server in the wireless local area network via the HTTPS;

step 3, the shared server in the wireless local area network saves the received SSID, the terminal location and the access key;

step 3 may comprise the following steps:

step 3-1, the shared server in the wireless local area network can search in the area saving the SSID, the terminal location and the access key according to the SSID, and judges whether there is a searched-out SSID record the same as the received SSID or not, if they are the same, proceed to step 3-2; otherwise, proceed to step 3-6;

step 3-2, judge whether the terminal location record corresponding to the SSID record is the same as the received terminal location or not, if they are the same, proceed to step 3-3; otherwise, proceed to step 3-6;

step 3-3, judge whether the access key corresponding to the terminal location record is the same as the received access key or not, if they are the same, proceed to step 3-4; otherwise, proceed to step 3-5;

step 3-4, maintain the existing saved record;

step 3-5, replace the existing saved record with the received SSID, the terminal location and the access key, and end;

step 3-6, take the received SSID, the terminal location and the access key as a new record to save, and end;

step 4, the terminal UE B which does not know the wireless local area network access key turns on the Wi-Fi switch at the position L, and searches out a Wi-Fi hotspot (Hotspot X) which needs the access key in order to access into the network;

step 5, the UE B sends an access key request to the shared server in the wireless local area network through the HTTPS, and the request carries its own saved service set identifier (SSID) and terminal location;

step 6, the wireless shared server analyzes the request message, and searches for an access key corresponding to the SSID and the terminal location carried in the access key request according to the saved SSID, the terminal location and the access key, and sends the matched access key to the UE B via the HTTPS;

Step 7, the UE B accesses to the Hotspot X through the access key

Figure 2:
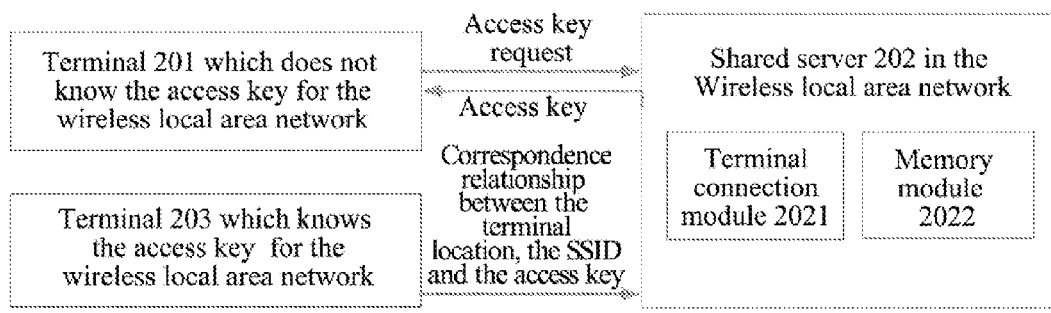
FIG. 2 is a schematic diagram of the composition of a system for a terminal which does not know the access key accessing to the wireless local area network in the present embodiment.

FIG. 2 is a schematic diagram of the composition of a system for a terminal accessing to the wireless local area network in accordance with the present embodiment.

The system comprises: terminal 201 which does not know the wireless local area network access key and sharing server 202 in the wireless local area network, wherein, the terminal 201 is configured to: send an access key request to the shared server 202 in the wireless local area network, and the request carries the terminal location and the service set identifier (SSID); as well as access to the access key from the shared server 202 in the wireless local area network and access to the wireless local area network based on the access key;

the shared server 202 in the wireless local area network is configured to: select an access key according to the correspondence relationship between the terminal location, the SSID and the access key, and sends the selected access key to the terminal.

The system further comprises terminal 203 which knows the wireless local area network access key, and it is configured to: send the correspondence relationship between the terminal location, the SSID and the access key to the shared server in the wireless local area network; in order to ensure the security of information interaction between the terminal and the sharing server 202 in the wireless local area network, the terminal which knows the wireless local area network access key can notify the shared server 202 in the wireless local area network of the correspondence relationship between the terminal location, the SSID and the access key through the Hypertext Transfer Protocol Secure (HTTPS) after accessing to the wireless local area network via the access key.

The abovementioned shared server in the wireless local area network 202 further comprises terminal connection module 2021 and memory module 2022, wherein, the terminal connection module 2021 is configured to: receive a message from the terminal, if the message is an access key request carrying the terminal location and the SSID, search in the memory module 2022 for the access key corresponding to the SSID and the terminal location, and send the access key to the terminal; if the message is a combination of the SSID, the terminal location and the access key, then save the SSID, the terminal location and the access key into the memory module 2022;

the memory module 2022 is configured to: save the correspondence relationship between the SSID, the terminal location and the access key.

Figure 3:
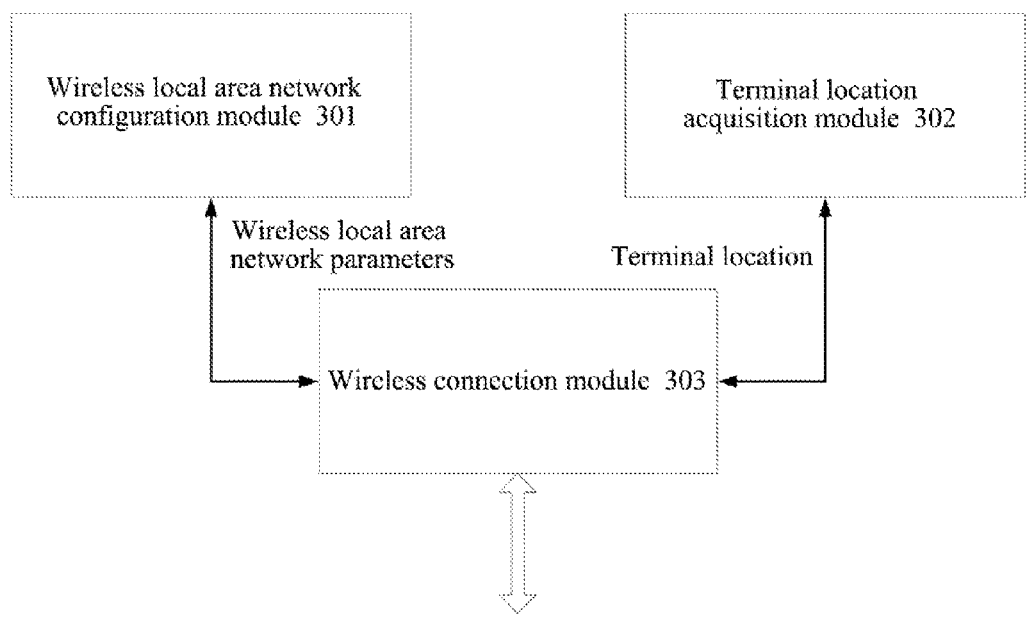
FIG. 3 is a schematic diagram of the component modules of a terminal which accesses to the wireless local area network in the present embodiment.

FIG. 3 is a schematic diagram of component modules of the terminal which accesses to the wireless local area network in the present embodiment.

The terminal comprises: wireless local area network connection module 303, wireless local area network configuration module 301, and terminal location acquisition module 302, wherein, the wireless local area network configuration module 301 is configured to: acquire wireless local area network parameters which comprise a service set identifier (SSID);

the terminal location acquisition module 302 is configured to: acquire the current terminal location; and the wireless local area network connection module 303 is configured to: access to the wireless local area network based on the access key; judge whether the wireless local area network parameters saved in the wireless local area network configuration module 301 comprise the access key or not; if the access key is not comprised, send an access key request to the shared server in the wireless local area network which saves the correspondence relationship between the SSID, the terminal location and the access key, and the access key request carries the SSID obtained from the wireless local area network configuration module 301 and the current terminal location obtained from the terminal location acquisition module 302; and send the access key come from the shared server in the wireless local area network to the wireless local area network configuration module 301.

The abovementioned wireless local area network connection module 303 is further configured to: if determined that the wireless local area network parameters saved in the wireless local area network configuration module 301 comprise the access key, after accessing to the wireless local area network according to the access key, send a network shared triple to the shared server in the wireless local area network, wherein the network shared triple is the SSID and the access key acquired from the wireless local area network configuration module 301, as well as the current terminal location acquired from the terminal position acquisition module 302.

The wireless local area network connection module 303 is further configured to: if determined that the wireless local area network parameters saved in the wireless local area network configuration module comprise the access key, and in the case that the wireless local area network is not shared by other terminals, after accessing to the wireless local area network according to the access key, send the network shared triple to the shared server in the wireless local area network, so as to avoid the terminal which does not know the access key from sending the access key to the shared server in the wireless local area network after acquiring the access key from the shared server in the wireless local area network, thereby saving the terminal consumption and the network overhead. The method for the terminal learning whether the wireless local area network is shared with other terminals or not can comprise: the shared server in the wireless local area network notifies the terminal of whether the to-be-accessed wireless local area network is shared by other terminals or not when sending the access key to the terminal which does not know the access key.

To ensure the security of information interaction between the terminal and the wireless local area network shared server, the wireless connection module can send the access key request and/or the network shared triple to the shared server in the wireless local area network via the hypertext transfer protocol secure (HTTPS).

Figure 4:
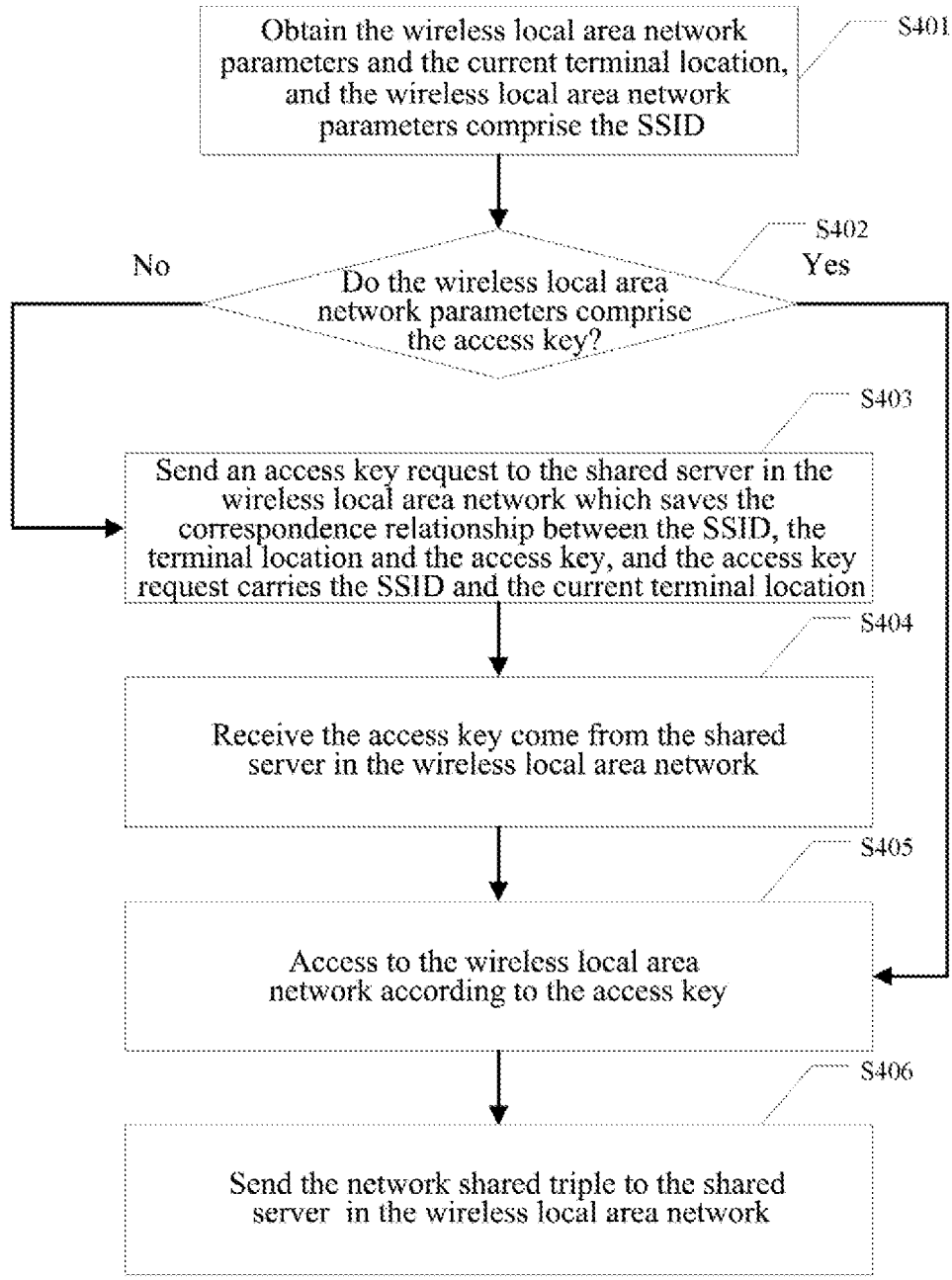
FIG. 4 is a flow chart of a method for a terminal accessing to the wireless local area network in the present embodiment.

FIG. 4 is a flow chart of the method for a terminal accessing to the wireless local area network in the present embodiment.

S401, Obtain the wireless local area network parameters and the current terminal location, and the wireless local area network parameters comprise the service set identifier (SSID);

S402, Judge whether the wireless local area network parameters comprise the access key or not, if the access key is not comprised, proceed to step S403; otherwise, proceed to step S405;

S403, Send an access key request to the shared server in the wireless local area network which saves the correspondence relationship between the SSID, the terminal location and the access key, and the access key request carries the obtained SSID and the current terminal location;

S404, Receive the access key from the shared server in the wireless local area network;

S405, Access to the wireless local area network according to the access key.

S406, Send the network shared triple to the shared server in the wireless local area network, and the network shared triple is the SSID and the access key acquired from the wireless local area network configuration module and the current terminal location acquired from the terminal location acquisition module.

In step S406, the terminal can first judge whether the to-be-accessed wireless local area network is shared by other terminals or not, if the to-be-accessed wireless local area network is not yet shared by other terminals, send the network shared triple to the shared server in the wireless local area network.

In the abovementioned embodiment, the access key request and/or the network shared triple is sent to the shared server in the wireless local area network via the Hypertext Transfer Protocol Secure (HTTPS).

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

It should be noted that the present document can have a variety of other embodiments, and without departing from the spirit and essence of the present document, a person skilled in the art can make various changes and modifications corresponding to the present document, and these corresponding changes and modifications should belong to the protection scope of the appended claims of the present document.

INDUSTRIAL APPLICABILITY

With the abovementioned technical scheme, when accessing to the wireless local area network, the terminal automatically acquires an access key from the shared server in the wireless local area network, and no longer needs to take time to laboriously find the wireless local area network administrator for the access key, thereby improving the efficiency of the terminal accessing to the wireless local area network.

What is claimed is:

1. A method for a terminal accessing to a wireless local area network, comprising:

a terminal which does not know a wireless local area network access key sending a key acquisition request to a shared server in the wireless local area network, wherein the request carries a terminal location and a service set identifier (SSID);

the shared server in the wireless local area network selecting an access key based on a correspondence relationship between the terminal location, the SSID and the access key, and sending the selected access key to the terminal; and the terminal accessing to the wireless local area network according to the access key;

wherein, the method further comprises: the shared server in the wireless local area network saving the received SSID, the terminal location and the access key, which comprises:

step one, the shared server in the wireless local area network searching in records saving the SSID, the terminal location and the access key according to the received SSID, and judging whether a searched-out SSID record is the same as the received SSID or not, if same, proceed to step two; otherwise, proceed to step six;

step two, judging whether a terminal location record corresponding to the SSID record is the same as the received terminal location or not, if same, proceed to step three; otherwise, proceed to step six;

step three, judging whether an access key corresponding to the terminal location record is the same as the received access key or not, if same, proceed to step four; otherwise, proceed to step five;

step four, maintaining the existing saved record;

step five, replacing the existing saved record with the received SSID, the terminal location and the access key, and ending;

step six, taking the received SSID, the terminal location and the access key as a new record to save, and ending.

2. The method of claim 1, wherein, the method further comprises:

the correspondence relationship between the terminal location, the SSID and the access key being notified by a terminal which already knows the wireless local area network access key to the shared server in the wireless local area network.

3. The method of claim 2, wherein, the step of the correspondence relationship between the terminal location, the SSID and the access key being notified by the terminal which knows the wireless local area network access key to the shared server in the wireless local area network comprises:

after accessing to the wireless local area network via the access key, the terminal which knows the wireless local area network access key notifying the shared server in the wireless local area network of the correspondence relationship between the terminal location, the SSID and the access key via a Hypertext Transfer Protocol Secure (HTTPS).

4. A system for a terminal accessing to a wireless local area network, comprising: a terminal which does not know a wireless local area network access key and a shared server in the wireless local area network, wherein, the terminal comprises hardware performing instructions stored in a non-transitory computer readable medium which executes the following steps: sending an access key request to the shared server in the wireless local area network, and the request carries a terminal location and a service set identifier (SSID); and receiving an access key sent from the shared server in the wireless local area network and accessing to the wireless local area network according to the access key; and the shared server in the wireless local area network comprises hardware performing instructions stored in a non-transitory computer readable medium which executes the following steps: selecting an access key according to a correspondence relationship between the terminal location, the SSID and the access key, and send the selected access key to the terminal, and saving the received SSID, the terminal location and the access key by the following way:

step one, the shared server in the wireless local area network searching in records saving the SSID, the terminal location and the access key according to the received SSID, and judging whether a searched-out SSID record is the same as the received SSID or not, if same, proceed to step two; otherwise, proceed to step six;

step two, judging whether a terminal location record corresponding to the SSID record is the same as the received terminal location or not, if same, proceed to step three; otherwise, proceed to step six;

step three, judging whether an access key corresponding to the terminal location record is the same as the received access key or not, if same, proceed to step four; otherwise, proceed to step five;

step four, maintaining the existing saved record;

step five, replacing the existing saved record with the received SSID, the terminal location and the access key, and ending;

step six, taking the received SSID, the terminal location and the access key as a new record to save, and ending.

5. The system of claim 4, wherein, the system further comprises a terminal which knows the wireless local area network access key, the terminal which knows the wireless local area network access key comprises hardware performing instructions stored in a non-transitory computer readable medium which executes the following step: sending the correspondence relationship between the terminal location, the SSID and the access key to the shared server in the wireless local area network.

6. The system of claim 5, wherein, the terminal which knows the wireless local area network access key comprises hardware performing instructions stored in a non-transitory computer readable medium which executes the following step: sending the correspondence relationship between the terminal location, the SSID and the access key to the shared server in the wireless local area network in the following way:

after accessing to the wireless local area network through the access key, notifying the shared server in the wireless local area network of the terminal location, the SSID and the access key via a Hypertext Transfer Protocol Secure (HTTPS).

7. A terminal which accesses to a wireless local area network, comprising hardware performing instructions stored in a non-transitory computer readable medium which executes steps in following modules: a wireless local area network connection module, a wireless local area network configuration module, and a terminal location acquisition module, wherein, the wireless local area network configuration module is configured to: acquire wireless local area network parameters which comprise a service set identifier (SSID);

the terminal location acquisition module is configured to: acquire and save a current terminal location; and the wireless local area network connection module is configured to: access to the wireless local area network according to an access key; judge whether the wireless local area network parameters saved in the wireless local area network configuration module comprise an access key or not; if the access key is not comprised, send an access key request to a shared server in the wireless local area network which saves a correspondence relationship between the SSID, the terminal location and the access key, and the access key request carries the SSID acquired from the wireless local area network configuration module and the current terminal location acquired from the terminal location acquisition module; and send the access key from the shared server in the wireless local area network to the wireless local area network configuration module;

wherein, the shared server in the wireless local area network comprises hardware performing instructions stored in a non-transitory computer readable medium which executes the following step: saving the received SSID, the terminal location and the access key by the following way:

step one, the shared server in the wireless local area network searching in records saving the SSID, the terminal location and the access key according to the received SSID, and judging whether a searched-out SSID record is the same as the received SSID or not, if same, proceed to step two; otherwise, proceed to step six;

step two, judging whether a terminal location record corresponding to the SSID record is the same as the received terminal location or not, if same, proceed to step three; otherwise, proceed to step six;

step three, judging whether an access key corresponding to the terminal location record is the same as the received access key or not, if same, proceed to step four; otherwise, proceed to step five;

step four, maintaining the existing saved record;

step five, replacing the existing saved record with the received SSID, the terminal location and the access key, and ending;

step six, taking the received SSID, the terminal location and the access key as a new record to save, and ending.

8. The terminal of claim 7, wherein,
the wireless local area network connection module is further configured to: if determined that the wireless local area network parameters saved in the wireless local area network configuration module comprise the access key, after accessing to the wireless local area network according to the access key, send a network shared triple to the shared server in the wireless local area network, and the network shared triple is the SSID and the access key acquired from the wireless local area network configuration module, as well as the current terminal location acquired from the terminal location acquisition module.

9. The terminal of claim 7, wherein,
the wireless local area network connection module is further configured to: if determined that the wireless local area network parameters saved in the wireless local area network configuration module comprise an access key, and in the case that the wireless local area network is not shared by other terminals, after accessing to the wireless local area network in accordance with the access key, send a network shared triple to the shared server in the wireless local area network, and the network shared triple is the SSID and the access key acquired from the wireless local area network configuration module, as well as the current terminal location acquired from the terminal location acquisition module.

10. The terminal of claim 9, wherein,
the wireless local area network connection module is configured to: send the access key request and/or the network shared triple to the shared server in the wireless local area network through the following ways:

sending the access key request and/or the network share triple to the shared server in the wireless local area network through a hypertext transfer protocol secure (HTTPS).

11. A method for a terminal accessing to a wireless local area network, comprising:

the terminal obtaining wireless local area network parameters and a current terminal location, wherein the wireless local area network parameters comprise a service set identifier (SSID);

the terminal judging whether the wireless local area network parameters comprise an access key or not, if the access key is not comprised, sending an access key request to a shared server in the wireless local area network which saves a correspondence relationship between the SSID, the terminal location and the access key, wherein the access key request carries the obtained SSID and the current terminal location;

the terminal receiving the access key from the shared server in the wireless local area network; and the terminal accessing to the wireless local area network according to the access key;

wherein, the method further comprises: the shared server in the wireless local area network saving the received SSID, the terminal location and the access key, which comprises:

step one, the shared server in the wireless local area network searching in records saving the SSID, the terminal location and the access key according to the received SSID, and judging whether a searched-out SSID record is the same as the received SSID or not, if same, proceed to step two; otherwise, proceed to step six;

step two, judging whether a terminal location record corresponding to the SSID record is the same as the received terminal location or not, if same, proceed to step three; otherwise, proceed to step six;

step three, judging whether an access key corresponding to the terminal location record is the same as the received access key or not, if same, proceed to step four; otherwise, proceed to step five;

step four, maintaining the existing saved record;

step five, replacing the existing saved record with the received SSID, the terminal location and the access key, and ending;

step six, taking the received SSID, the terminal location and the access key as a new record to save, and ending.

12. The method of claim 11, wherein, the method further comprises:

if the wireless local area network parameters comprise the access key, the terminal accessing to the wireless local area network according to the access key; and the terminal sending a network shared triple to the shared server in the wireless local area network, wherein the network shared triple is the SSID, the access key and the current terminal location.

13. The method of claim 12, wherein, the step of the terminal sending the network shared triple to the shared server in the wireless local area network further comprises:

the terminal judging whether the wireless local area network which is to be accessed is shared by other terminals or not, if the wireless local area network which is to be accessed is not yet shared by the other terminals, sending the network shared triple to the shared server in the wireless local area network.

14. The method of claim 13, wherein,
the step of the terminal sending the access key request and/or the network shared triple to the shared server in the wireless local area network further comprises:
sending the access key request and/or the network shared triple to the shared server in the wireless local area network via a Hypertext Transfer Protocol Secure (HTTPS).

* * * * *